Patented Sept. 22, 1942

2,296,639

UNITED STATES PATENT OFFICE 2,296,639

HIGH SURFACE HIDING PIGMENT MATERIAL AND PROCESS OF MAKING THE SAME

Marion L. Hanahan, Wilmington, Del., assignor to E. I. du Pont de Nemours & Company, Wilmington, Del., a corporation of Delaware No Drawing. Application February 2, 1939,
Serial No. 254,161

21 Claims. (Cl. 106—294)

This invention relates to the art of pigment materials. More particularly it relates to the improvement of the properties of white pigment materials. Still more particularly it relates to the improvement of the hiding power of zinc sulfide pigments in flat paint formulations, paper coating compositions, etc.

Zinc sulfide pigments such as pigment zinc sulfide, lithopone which comprises about 30% zinc sulfide and about 70% barium sulfate, high zinc sulfide lithopone which comprises about 50% zinc sulfide and about 50% barium sulfate, titanated lithopone which comprises about 85% lithopone and about 15% pigment titanium dioxide, and the like, are used extensively in flat paint formulations. It is commonly believed in the art that the hiding and brightening power of the aforementioned zinc sulfide pigments when used in coating compositions, which compositions are to be applied to wood, metal, paper, linoleum, oilcloth, and the like, or when used as fillers in paper, rubber, and the like, is dependent entirely upon the index of refraction, color, and ultimate particle size of said pigments. I have discovered, however, that such is not the case. While such properties as index of refraction, color, and ultimate particles size do exert an effect, I have found that when the pigment is used in certain compositions, such as flat paint formulations and casein and starch paper coating compositions, and when used as a filler such as a paper filler, its hiding power is dependent to a certain extent on pigment oil absorption and to a remarkable and hitherto unrealized extent on a property which I call "surface hiding power." Pigments having the property of high surface hiding power are of tremendous industrial importance. Such pigments have particularly high hiding power in flat paint formulations, and as a result, can be considered to have high flat hiding power in such formulations. Furthermore, they have high opacifying power in paper, and in starch and casein coating compositions applied to the surface of paper. As a matter of fact, I have discovered that pigments having the property of high surface hiding power produce high hiding, opacifying and/or brightening in all pigment-adhesive systems in which the mean index of refraction of the adhesive system is substantially lower than 1.5. A sheet of paper, for example, can be considered to be an adhesive comprising essentially paper fiber having an index of refraction of approximately 1.53 and air of index of refraction of 1. The mean index of refraction of said adhesive is substantially lower than 1.5 and white pigments therein having high surface hiding power are definitely better opacifying and brightening agents than are comparable prior art pigments of essentially equal index of refraction, color, and ultimate particle size. Again, flat paint films, in which I have found high surface hiding pigments to be so effective, comprise numerous void spaces and/or pigment-air interfaces. As a consequence, the effective mean index of refraction of the adhesive portion is substantially lower than that of the binder portion, e. g. is substantially lower than 1.5. However, I have discovered that in pigment-adhesive systems in which the effective mean index of refraction of the adhesive approximates or exceeds 1.5, such as enamel paint films in which the pigment is essentially immersed in the binder, the property of high surface hiding power does not influence the hiding power of a pigment.

In my co-pending application Serial No. 244,571 filed December 8, 1938, I have disclosed a process whereby the property of high surface hiding power may be imparted to zinc sulfide and other high index of refraction pigment materials. Said process broadly comprises forming on the surface of the pigment materials a gel-like structure of silica by reacting a water soluble silicate with an acid in an aqueous suspension of the pigment material. While said process provides pigments having the hitherto unknown property of high surface hiding power and produces pigment materials, especially zinc sulfide pigments having markedly higher hiding power in flat paint formulations and markedly higher opacifying and brightening power in paper coating compositions and when employed as paper fillers, than any prior art pigment material, the products of said process have been found deficient in certain instances in that when employed in oleaginous flat paint compositions containing small amounts of water said pigment materials provide paints which are too thick for normal use, i. e., said pigment materials are highly water sensitive.

For a better understanding of the characteristics desired in pigment materials used in flat paint formulations, it will be necessary to explain the various terms used herein and the methods of testing employed.

Flat paint formulation

A flat paint formulation produces a dry paint film in which the binder portion is insufficient to fill all void spaces between pigment particles and which in consequence has a micro rough surface of relatively low specular reflection. Such a paint has a pigmentation in excess of about 40% by volume on the dry film and usually in excess of about 50% by volume.

On the other hand, an enamel paint formulation produces a dry paint film in which the binder portion is sufficient to fill essentially all void spaces between pigment particles and which in consequence has a micro smooth surface of relatively high specular reflection. Such a paint has a pigmentation of less than about 35% by volume on the dry film and usually less than about 30% by volume.

Hiding power

Hiding power may be defined qualitatively as that property of a paint which enables it to obliterate beyond recognition any background over which it may be spread. Mathematically, it may be expressed as square feet per gallon of paint.

It is determined by the procedure entitled "Krebs dry film incomplete hiding power" described by Henry A. Gardner in "Physical and Chemical Examination of Paints, Varnishes, Lacquers and Colors," 8th edition, January 1, 1937, pp. 45-51.

In this test the paints being studied are painted out on a surface on which a design of concentric light and dark diamonds is printed. The light and dark bands are ½" wide. Their lightness factors are 75% and 40% respectively. The area of the surface is one square foot. It is printed on heavy paper and then coated with a nitrocellulose lacquer. In applying the paint a 20 cubic centimeter Luer type glass syringe filled with the paint, and the brush, also filled with the paint, are weighed together. The paint is spread uniformly over the chart with the syringe and then spread with the brush. The syringe and brush are again weighed. Several brushouts, for example, six or eight, are made with a paint selected as the standard, beginning with five to seven cubic centimeters of paint and increasing the amount in increments of 0.5 to 1.0 cubic centimeter. The application of the paint by volume is merely a guide. The actual weight of the paint applied, as determined by the difference in weight of the syringe and brush before and after application, is used in the calculation. Two or three brushouts of the paints to be compared are then prepared with different quantities of paint such as 6, 7, and 8 cubic centimeters.

When dry, the brushouts are numbered consecutively in the order of increasing quantity of paint for identification. The sample brushouts are then located with respect to their degree of hiding by placing each of them between reference standard showing less or more hiding. If possible, the ratings should be estimated in tenths. Thus 2.4 means that the sample is located 0.4 of an interval between standards No. 2 and No. 3.

The hiding power of a paint is calculated as follows:

$$\text{Hiding power} = \frac{\text{volume of standard paint}}{\text{volume of sample paint}} \times 100$$

when the volume of standard paint is that required to give the same contrast as that given by the volume of sample paint.

The following is a specific example of a hiding power determination made by this method:

| | |
|---|---|
| Weight of standard paint per gal____lbs__ | 15.69 |
| Weight of sample paint per gal_____lbs__ | 13.54 |
| Brushout of sample_____g__ | 5.40 |
| Brushout of standard 1_____g__ | 6.50 |
| Brushout of standard 2_____g__ | 7.40 |
| Sample rating _____ | 1.4 |

Hence, weight of standard paint of equivalent hiding is:

$$6.50 + 0.4(7.4 - 6.5) = 6.86 \text{ g.}$$

The volume of which is:

$$\frac{6.86 \times 8.33}{15.69} = 3.64 \text{ cubic centimeters}$$

The volume of the sample is:

$$\frac{5.40 \times 8.33}{13.54} = 3.32 \text{ cubic centimeters}$$

The relative hiding power of the sample is:

$$\frac{3.64}{3.32} \times 100 = 110$$

Pigment flat hiding power

Strictly speaking, the expression "hiding power" should only be applied to paint formulae, i. e. to mixtures of pigment and vehicle. Nevertheless, pigments may be said to possess potential hiding power and the potential hiding power of a pigment in a flat paint formulation may be considered to be its flat hiding power. This flat hiding power is defined as follows:

$$\text{F. H. P.} = \frac{\text{Wt. standard pigment per unit vol. standard paint}}{\text{Wt. sample pigment per unit vol. sample paint}} \times \text{H. P.}$$

in which F. H. P. is the flat hiding power of the sample pigment and H. P. is the hiding power of the sample flat paint as determined by the hereinbefore described "Krebs dry film incomplete hiding power" procedure.

Oil absorption

Oil absorption is the amount of oil in grams required to wet 100 grams of pigment.

The method of testing is described on pages 540-541 of Gardner's above cited book.

A five gram sample is used. Acid refined linseed oil of acid number 12.5 is added slowly from a burette and worked into the pigment with a spatula on a smooth glass plate. The addition of oil is continued a drop or two at a time until the pigment can be collected in one coherent mass adhering to the spatula but not wetting the glass. The amount of oil used to wet the pigment is read from the burette.

This invention has as an object the production of pigment materials of high surface hiding power. A further object is the production of pigment materials having high surface hiding power and low water sensitivity. A still further object is to increase the flat hiding power of white pigment materials employed in flat paints. A still further object is to provide zinc sulfide pigments having hitherto unrealized high flat hiding power and low water sensitivity. A still further object is to increase the opacifying and brightening power of zinc sulfide pigments employed as paper fillers and in paper coating. A still further object is to increase the oil absorption of pigment materials. A still further object is to increase pigment material dry bulking value, i. e. the volume per unit weight of dry pigment. Additional objects will become apparent from an examination of the following description and claims.

These objects are attained according to the herein described invention which broadly comprises mixing with an aqueous suspension of a pigment material a water soluble silicate and a water soluble salt of a polyvalent metal and precipitating the silica as a coating of insoluble silicate on the particles of said pigment material, dewatering the pigment material suspension and drying the pigment material without calcination.

In a more restricted sense this invention comprises mixing with an aqueous suspension of a zinc sulfide pigment between about 0.25% and about 10%, calculated as $SiO_2$ and based on the weight of the pigment before treatment, of a water soluble silicate. After the slurry has been agitated sufficiently to insure uniform distribution of the dissolved silicate, a water soluble salt of a polyvalent metal is added in an amount corresponding to from about 0.08 to about 4 gram equivalents of metallic ion per mole of $SiO_2$ in the previously added dissolved silicate, thereby forming a coating of a polyvalent metal silicate on the surface of the zinc sulfide pigment particles. Examples of water soluble salts of polyvalent metals useful in my novel process include the water soluble salts of calcium, magnesium, barium, zinc, aluminum, strontium, beryllium, cadmium, and the like. The slurry is subsequently dewatered and the pigment dried without calcination.

The preferred embodiment of this invention comprises mixing with an aqueous suspension of a zinc sulfide pigment, preferably an aqueous suspension of a wet milled calcined lithopone, comprising in excess of about 250 grams pigment per liter, between about 0.35% and about 1.5%, calculated as $SiO_2$ and based upon the weight of the pigment before treatment, of a water soluble sodium silicate. After the slurry has been agitated sufficiently to insure uniform distribution of the added agent, an aqueous calcium chloride solution is added in an amount corresponding to from about 1 to about 2 gram equivalents of calcium per mole of $SiO_2$ in the added sodium silicate. Subsequently the slurry is dewatered, as by filtering, and the pigment dried at a temperature between about 110° C. and about 175° C.

The following examples are given for illustrative purposes and are not intended to place any restrictions or limitations on the herein described invention.

Example I

Sodium silicate solution, containing 23.5% $SiO_2$ and having a $SiO_2:Na_2O$ ratio of 3.8:1, was added to several water suspensions of calcined wet milled lithopone comprising 400 grams of lithopone in 1 liter of slurry, in various amounts as indicated in the following table. After a very thorough agitation, solutions of $CaCl_2$ in the amounts shown in the table were mixed with the suspended pigments. After agitation sufficient to insure uniform distribution, sodium carbonate solution was added to each until the slurries reached a pH of 9.0. Further agitation of the suspensions was continued. The slurries were heated to above 50° C., which heating aids in the removal of water soluble salts and hastens the filtration, and then dried at 140° C. The resulting pigments were dry milled by passage through a squirrel case disintegrator, to provide pigment samples designated as Samples A, B, C, D, E, F, G, H, I, J and K.

Evaluation of the pigments so prepared by my novel process showed that they possessed the following properties:

| Pigment sample | Percent sodium silicate added (calculated as $SiO_2$ on the basis of the pigment weight) | Percent calcium chloride added (calculated as $CaCl_2$ on the basis of the pigment weight) | Gram equivalents $Ca^{++}$ added per mole $SiO_2$ | Hiding power in representative flat paint formulation | O. A. |
|---|---|---|---|---|---|
| A | 0 | 0 |  | 100 | 15.0 |
| B | 0.35 | .511 | 1.58 | 115 | 16.3 |
| C | 0.70 | .511 | 0.79 | 135 | 17.0 |
| D | 1.40 | .511 | 0.39 | 130 | 18.2 |
| E | 0.70 | .111 | 0.17 | 135 | 16.5 |
| F | 0.70 | .277 | 0.43 | 135 | 16.7 |
| G | 0.70 | 1.330 | 2.06 | 135 | 17.5 |
| H | 0.30 | .594 | 2.14 | 110 | 16.2 |
| I | 0.50 | .990 | 2.14 | 125 | 16.8 |
| J | 0.70 | 1.385 | 2.14 | 135 | 17.5 |
| K | 0.90 | 1.781 | 2.14 | 140 | 18.0 |

From the above table, it is demonstrated that the hiding power in a flat paint formulation increases with increased silicate treatment up to a maximum of about 1%, calculated as $SiO_2$ on the basis of the pigment weight, and that the amount of calcium added, above that necessary for coagulation, has little effect on the hiding power. However, the water sensitivity of the paint made with these pigments varies with the amount of calcium treatment. The amount of calcium treatment can then be used to control said property at the most desirable point.

Example II

Sodium silicate solution containing 23.5% $SiO_2$ and having a $SiO_2:Na_2O$ ratio of 3.8:1 was added to a slurry of wet milled calcined lithopone, having a concentration of 400 grams pigment per liter, in the amount of 0.7% $SiO_2$ on the basis of the dry weight of the untreated lithopone. After thorough mixing, a solution of aluminum sulfate in the amount of 0.53% calculated as $Al_2(SO_4)_3$ was added. The suspension was agitated for one half hour, and barium hydroxide solution added to pH 8.0. The pigment was filtered, dried at 120° C. and dry milled by passage through a squirrel cage disintegrator. The flat hiding power of the treated pigment was 25% greater than that of the untreated pigment, when tested in a representative flat paint formulation.

Example III

Sodium silicate solution containing 23.5% $SiO_2$ and having a $SiO_2:Na_2O$ ratio of 3.8:1 was added to a slurry containing 400 grams of wet milled calcined lithopone per liter, in the amount of 0.7% $SiO_2$ on the basis of the lithopone dry weight. After being agitated sufficiently to insure even distribution of the sodium silicate, barium chloride solution in the amount of 0.755% calculated as $BaCl_2$, was added to the slurry which was again agitated. Sodium carbonate solution was added to the slurry until the pH reached 9.0. After filtration, drying, and dry milling this product, the pigment was found to have a flat hiding power in a representative flat paint formulation 30% greater than that of the untreated lithopone.

Example IV

Sodium silicate solution containing 23.5% $SiO_2$ and having a $SiO_2:Na_2O$ ratio of 3.8:1 was added to a slurry containing 400 grams per liter of wet milled calcined lithopone, in the amount of 0.7% $SiO_2$ based on the weight of the dry lithopone. After vigorous agitation, a solution of magnesium sulfate was added to the slurry in the amount of 0.44%, calculated as $MgSO_4$, based on the weight of the dry untreated lithopone. Sodium carbonate solution was added after agitation until the slurry reached a pH of 9.0. The treated lithopone was dewatered, dried and dry ground to a suitable fineness. When tested in a representative flat paint formulation, this product yielded a flat hiding power 30% greater than the untreated lithopone.

It is to be understood that the hereinbefore described specific embodiments of my invention may be subjected to variations and modifications without departing from the scope of this invention. For instance, while the invention has been described with particular application to the treatment of lithopone, the treatment of other types of pigment materials is also contemplated. Accordingly, the term "pigment material" as employed herein and in the appended claims includes white pigment materials such as zinc sulfide pigments, titanates of divalent metals, zirconium oxide, zinc oxide, antimony oxide, white lead, and the like, comprising prime white pigments such as $Sb_2O_3$, $2PbCO_3.Pb(OH)_2$, $PbSO_4$, $PbSO_4.PbO$, $TiO_2$, $CaTiO_3$, $MgTiO_3$, $ZnTiO_3$, $ZnO$, $ZnS$, $ZrO_2$, and the like, as well as extender materials such as anhydrite, gypsum, barium sulfate, calcium carbonate, calcium sulfite, barium carbonate, silica, aluminum silicates, aluminum oxide, magnesium fluoride, sodium fluoride, aluminum fluoride, sodium fluosilicate, sodium aluminum fluoride, magnesium fluosilicate, pachnolite, calcium fluoride, and the like, and also colored pigments such as ultramarine blue, chrome yellow, basic zinc chromate, chrome red, chrome orange, chrome green, barium chromate, iron blue, earth colors such as iron oxide, and the like. Moreover, the term "zinc sulfide pigment" as employed herein and in the appended claims includes not only lithopone, but also those pigment materials such as pigment zinc sulfide, high zinc sulfide lithopone, titanated lithopone, and the like, comprising substantial amounts of pigment zinc sulfide, whose pigment properties have been developed by calcination, autoclaving, or other treatment, as by the processes of U. S. Patents 1,704,483, 1,977,583, 2,006,259, and the like.

It is further to be understood that in the case of such pigment materials as the lithopone product of U. S. Patent 1,704,483, and the like, which are calcined during the process of manufacture of said pigment materials, the treating agent is added to the calcined pigment material and not to the pigment material before the calcining operation, i. e. it is to be understood that the pigment material should not be calcined after addition of the treating agent.

It is still further to be understood that the treating agent employed may be a solution of one or any combination of water soluble silicates, such as water soluble silicates of sodium, potassium, rubidium, cesium, and the like. However, because of the superior results obtained therewith, the silicate solutions which I prefer to employ are those of the water soluble sodium silicates, preferably a sodium silicate having an $SiO_2:Na_2O$ ratio of about 3.8:1 by weight.

It is still further to be understood that any water soluble salt of a polyvalent metal may be employed as precipitant. Examples of said salts include the water soluble salts of beryllium, magnesium, calcium, strontium, barium, zinc, cadmium, and aluminum, and the like. It is to be understood that the term "water soluble" as used herein and in the appended claims refers to salts which are soluble in water at 20° C. to the extent of not less than about 2 grams per liter. On account of the superior results obtained therewith the water soluble salts which I prefer to employ are those of calcium, for example, calcium bromate, calcium bromide, calcium chlorate, calcium perchlorate, calcium chloride, calcium hypochlorite, calcium nitrate, calcium nitrite, calcium hypophosphite, calcium selenate, calcium bisulfite, calcium thiocarbonate, calcium dithionate, calcium thiosulfate, and the like. Moreover, because of its superiority as a precipitant in my novel process, and because of the superior product obtained therewith, the calcium salt which I prefer to employ is calcium chloride.

In most instances, I prefer to add the water soluble silicate to a pigment material suspension comprising not less than about 200 grams and preferably not less than about 250 grams of pigment material per liter and, thereafter, to precipitate the silica as a polyvalent metal silicate on the pigment material particles by subsequent addition of the precipitant, i. e., the water soluble salt of a polyvalent metal. However, I may practice the herein described invention by addition of the water soluble silicate solution to the pigment material suspension after the addition of the precipitant, although on account of the ease of manipulation and the superior results ordinarily obtained thereby, I usually prefer to add the precipitant after the addition of the soluble silicate solution. After the precipitation of the silicate on the pigment material particles has occurred, I have found it desirable to adjust the pH of the pigment material suspension to more than about 7 and preferably more than about 8, prior to the dewatering of said suspension, as by the addition of an alkaline reacting material such as barium hydroxide, sodium hydroxide, potassium hydroxide, sodium carbonate, potassium carbonate, and the like.

It is still further to be understood that the amount of treating agent required by a given pigment material can best be learned by experimental trial and the amount will vary with the treating agent, the type and previous history of the pigment material, the concentration of the pigment material slurry, and the properties desired in the finished pigment material. With the agents which I have found most satisfactory, viz., sodium silicates, appreciable effects are had by addition of the silicate in an amount corresponding to as little as about 0.25%, and in an amount equivalent to as high as about 10%, calculated as $SiO_2$ and based upon the weight of pigment material in the slurry. For optimum effects, however, I prefer to add the silicate in amounts equivalent to from about 0.35% to about 1.5% $SiO_2$. Percentages of water soluble silicates higher than about 10%, calculated as $SiO_2$, result in decreased surface hiding power.

The optimum amount of precipitant required in my process can best be learned by experimental trial and the amount will vary with the precipitant employed, the type and previous history of the pigment material, the concentration of the pigment material slurry, and the properties desired in the finished pigment material. I have discovered that it is essential that said precipitant should be added in an amount corresponding to not less than about 0.08 gram equivalent metallic ion per mole $SiO_2$ added as water soluble silicate, in order to develop maximum surface hiding power characteristics of the resultant pigment material. Furthermore, addition of said amount of precipitant produces a pigment material of low water sensitivity. Increasing the amount of precipitant added, provides a pigment material of still further decreased water sensitivity, but effects no substantial increase in the pigment material surface hiding power. Pigment materials of minimum water sensitivity are had when the precipitant is added in an amount corresponding to about 4 gram equivalents metallic ion per mole of $SiO_2$. While it is to be understood that I may practice my invention employing a precipitant in an amount corresponding to more than about 4 gram equivalents of metallic ion per mole of $SiO_2$, adding said precipitant in an amount greater than about 4 gram equivalents of metallic ion per mole of $SiO_2$ neither increases nor decreases the water sensitivity of the resultant product to any substantial degree. In most instances, however, I prefer to add the precipitant in an amount corresponding to from about 1 to about 2 gram equivalents of metallic ion per mole of $SiO_2$.

It is still further to be understood that drying of the pigment material coated with a polyvalent metal silicate is an essential step in my novel process. It is essential that the pigment should not be calcined after being coated with the silicate. I have found it desirable to dry the pigment at a temperature not in excess of about 300° C. and preferably not in excess of about 200° C. Temperatures of less than about 100° C. should be avoided unless the pigment is dried at subatmospheric pressures.

The herein described process imparts to pigment materials the property of surface hiding power. Furthermore, it imparts to said pigment material the properties of high oil absorption, high dry bulking value, and high flat hiding power. In addition, these produced according to the herein described invention have high opacifying and brightening power in paper and in coating compositions of casein, starch, and the like applied to the surface of paper.

Minor increases in surface hiding power are of little industrial importance. Therefore, the pigment materials produced according to my novel process as compared to prior art pigment materials have an increase of at least about 10% and preferably at least about 15% in flat hiding power, oil absorption, and dry bulking value. Further, the opacifying and brightening power of coatings of casein, starch, and the like when applied to paper, is increased at least about 10% and preferably at least about 15%.

It is to be understood that the increase in flat hiding power mentioned hereinbefore, refers to the percentage increase in flat hiding power of a treated pigment material as compared to the same pigment material before treatment by my novel process. This is determined according to the hereinbefore described pigment flat hiding power test, in a flat paint composition comprising 25.8% pigment material by volume, 25.92% 50 gal. limed rosin varnish, 4.18% acid refined linseed oil of acid number 5, and 44.1% petroleum spirits.

My process possesses advantages not previously combined in a single process. Furthermore, the products of my process possess advantages not previously combined in a pigment material. The high surface hiding pigment material resulting from the operation of my process, when used in flat paint formulations imparts heretofore unrealized high hiding to the dry paint film. Such paint formulations are prepared at essentially the same cost and are far superior to flat paints hitherto manufactured. Furthermore, the high surface hiding pigment materials of my invention have low water sensitivity and hence permit the formulation of oleaginous coating compositions containing small percentages of water, without adversely affecting the brushing and flow characteristics of said compositions. Moreover, the novel pigment products of my invention, when employed as paper fillers or in compositions of starch, casein, glue, and the like, applied to the surface of paper, produce papers which are definitely superior in opacity and brightness as compared to those pigmented in an analogous manner with corresponding prior art pigment materials.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for producing pigment materials of improved surface hiding power and low water sensitivity, which comprises mixing with an aqueous suspension of a pigment material a water soluble silicate and a water soluble salt of a polyvalent metal thereby precipitating the silica as a coating of a polyvalent metal silicate on the particles of said pigment material, dewatering the suspension and drying the pigment material without calcination.

2. A process for producing a zinc sulfide pigment of improved surface hiding power and low water sensitivity which comprises mixing a water soluble silicate with an aqueous suspension of a zinc sulfide pigment, thereafter adding to the slurry a water soluble salt of a polyvalent metal and precipitating the silica as a coating of a polyvalent metal silicate on the particles of said pigment, and thereafter dewatering the slurry and drying the pigment without calcination.

3. A process for producing pigment materials of improved surface hiding power and low water sensitivity which comprises mixing with an aqueous suspension of a pigment material between about 0.25% and about 10%, calculated as $SiO_2$ and based on the weight of the pigment material before treatment, of a water soluble silicate, thereafter adding to the slurry a water soluble salt of a polyvalent metal in an amount corresponding to not less than about 0.08 gram equivalent of metallic ion per mole of $SiO_2$ previously added as water soluble silicate, dewatering said slurry and drying the pigment material at a temperature not in excess of about 300° C.

4. A process for producing a zinc sulfide pigment of improved surface hiding power and low water sensitivity which comprises mixing with an aqueous suspension of a zinc sulfide pigment between about 0.35% and about 1.5%, calculated as $SiO_2$ and based on the weight of the pigment before treatment, of a water soluble silicate, thereafter adding calcium chloride to the slurry in an amount corresponding to from about 1 gram equivalent to about 2 gram equivalents of calcium per mole of $SiO_2$ previously added as water soluble silicate, and subsequently dewatering the slurry and drying the pigment at a temperature not in excess of about 200° C.

5. A process for producing a zinc sulfide pigment of improved surface hiding power and low water sensitivity which comprises mixing with an aqueous suspension of a zinc sulfide pigment between about 0.25% and about 10%, calculated as $SiO_2$ and based on the weight of the pigment before treatment, of a sodium silicate, thereafter adding to the slurry a water soluble salt of a polyvalent metal in an amount corresponding to from about 0.08 gram equivalent to about 4 gram equivalents of metallic ion per mole of $SiO_2$ previously added as sodium silicate, dewatering said slurry and drying the pigment at a temperature not in excess of about 300° C.

6. A pigment material of improved surface hiding power and low water sensitivity which comprises of pigment material coated with uncalcined polyvalent metal silicate.

7. A pigment material of improved surface hiding power and low water sensitivity which comprises a pigment material coated with uncalcined polyvalent metal silicate in an amount in the range of from about 0.25% to about 10%, calculated as $SiO_2$ and based on the weight of the pigment before treatment.

8. A pigment of improved surface hiding power and low water sensitivity which comprises a zinc sulfide pigment and between about 0.35% and about 1.5%, calculated as $SiO_2$ and based on the weight of the pigment before treatment, of a coating of uncalcined polyvalent metal silicate precipitated on the zinc sulfide pigment particles.

9. An improved pigment material comprising a pigment material coated with uncalcined polyvalent metal silicate, said improved pigment having at least about 10% higher flat hiding power than a comparable untreated pigment.

10. An improved zinc sulfide pigment whose particles are coated with between about 0.35% and about 1.5%, calculated as $SiO_2$ and based on the weight of the pigment before treatment, of uncalcined polyvalent metal silicate, said improved zinc sulfide pigment having at least about 10% greater flat hiding power than a similar pigment not coated with said polyvalent metal silicate.

11. A process for producing a pigment of improved hiding power which comprises mixing with an aqueous slurry of a pigment a water-soluble silicate, thereafter adding to the slurry a precipitant of the class consisting of water-soluble salts of polyvalent metals and water-soluble acids, thereby forming an insoluble precipitate in the presence of the pigment, the precipitate being in amount sufficient to increase the hiding power of the pigment, and then filtering and drying the pigment without calcination.

12. A process for producing a pigment of improved hiding power which comprises mixing with an aqueous slurry of pigment a water-soluble silicate, thereafter adding to the slurry calcium chloride as a precipitant, thereby forming an insoluble precipitate in the presence of the pigment, the precipitate being in amount sufficient to increase the hiding power of the pigment, and then filtering and drying the pigment without calcination.

13. A process for producing a pigment of improved hiding power which comprises mixing with an aqueous slurry of pigment a water-soluble silicate, thereafter adding to the slurry aluminum sulfate as a precipitant, thereby forming an insoluble precipitate in the presence of the pigment, the precipitate being in amount sufficient to increase the hiding power of the pigment, and then filtering and drying the pigment without calcination.

14. A pigment of improved hiding power comprising a base pigment, and the reaction product of an alkali metal silicate and a soluble salt capable of precipitating the silicate in insoluble form, the amount of said reaction product ranging from about 0.25% to about 10%, calculated as $SiO_2$ and based on the weight of the base pigment before treatment.

15. A pigment of improved hiding power comprising a base pigment of lithopone, and the reaction product of an alkali metal silicate and a soluble salt capable of precipitating the silicate in insoluble form, the amount of said reaction product being in amount sufficient to increase the hiding power of the pigment.

16. An improved pigment comprising pigment particles and the reaction product of a water-soluble silicate and a soluble salt capable of precipitating the silicate in insoluble form, the amount of said reaction product being sufficient to improve the pigment properties of the pigment.

17. A pigment of improved hiding power comprising lithopone and the reaction product of a water-soluble silicate and a soluble salt capable of precipitating the silicate in insoluble form, the amount of said reaction product ranging from about 0.25% to about 10%, calculated as $SiO_2$ and based on the weight of the pigment before treatment.

18. A pigment of improved hiding power comprising a base pigment and the insoluble reaction product of sodium silicate and calcium chloride, the amount of said reaction product ranging from about 0.25% to about 10%, calculated as $SiO_2$ and based on the weight of the pigment before treatment.

19. A pigment of improved hiding power comprising a base pigment and the insoluble reaction product of sodium silicate and aluminum sulfate, the amount of said reaction product ranging from about 0.25% to about 10%, calculated as $SiO_2$ and based on the weight of the pigment before treatment.

20. A pigment of improved hiding power comprising lithopone intimately associated with the precipitated reaction product of sodium silicate and calcium chloride, the amount of said reaction product ranging from about 0.25% to about 10%, calculated as $SiO_2$ and based on the weight of the pigment before treatment.

21. A pigment of improved hiding power comprising lithopone intimately associated with the precipitated reaction product of sodium silicate and aluminum sulfate, the amount of said reaction product ranging from about 0.25% to about 10%, calculated as $SiO_2$ and based on the weight of the pigment before treatment.

MARION L. HANAHAN.